United States Patent Office 3,396,125
Patented Aug. 6, 1968

3,396,125
ALKENE OXIDE POLYMERIZATION
Clinton F. Wofford, William R. Busler, and Henry L. Hsieh, Bartlesville, Okla., assignors to Phillips Petroleum Company, a corporation of Delaware
No Drawing. Filed June 7, 1965, Ser. No. 462,113
8 Claims. (Cl. 260—2)

ABSTRACT OF THE DISCLOSURE

Epoxide compounds are polymerized with a catalyst comprising (a) an organoaluminum compound, (b) a metal salt of a beta-diketone, and (c) water. The rubbery polymers produced are useful in the automobile industry for fabricating articles such as motor mounts, body mounts, suspension system parts, hoses, tubing, and the like.

---

This invention relates to alkene oxide polymerization. In one aspect, this invention relates to catalyst systems for polymerizing epoxides. In another aspect, this invention relates to processes of polymerizing alkene oxides.

Several different processes of polymerizing alkene oxides are described in the patent art and in the technical literature. The catalyst systems employed in some of these processes include organoaluminum compounds or organoaluminum compounds in admixture with a particular type of metal acetylacetonate. Other catalysts employed are organoaluminum compounds in admixture with a chelating agent such acetylacetone. The alkene oxide polymers produced by the catalyst systems of the prior art range in consistency from low molecular weight liquids to comparatively high molecular weight waxy solids with almost no elastomeric properties. A serious disadvantage with these catalyst systems insofar as alkene oxide polymerization is concerned is the low monomer conversion associated with their use. Another shortcoming of the prior art processes and catalyst systems for polymerizing alkene oxides is that rubbery polymers are ordinarily not produced.

According to this invention, these and other disadvantages of the prior art processes of polymerizing alkene oxides are overcome by providing a novel catalyst system comprising an organoaluminum compound, a metal salt of a beta-diketone, and water. The alkene oxide polymers produced by the catalyst of this invention are high molecular weight rubbers as evidenced by the high inherent viscosity of the product. A higher polymerization rate is also made possible by means of the catalyst system of this invention.

The organoaluminum component of the catalyst system can be a triorganoaluminum compound, an organoaluminum monohalide, organoaluminum monohydride, organoaluminum dihalide, organoaluminum dihydride, or organoaluminum sesquihalide. The metal salt of the beta-diketone of the catalyst system can be obtained by uniting a beta-diketone with a metal selected from Groups II–A, III–A, IV–A, I–B, II–B, IV–B, V–B, VI–B, VII–B, and VIII of the Periodic Table of the Elements reported in the "Handbook of Chemistry and Physics," 45th edition, page B–2, The Chemical Rubber Company (1964).

Any alkene oxide can be homopolymerized or copolymerized with another alkene oxide by means of the novel catalyst of this invention. When one or more of the alkene oxides is unsaturated, the resulting rubbery polymer product is sulfur vulcanizable.

Accordingly, it is an object of this invention to provide an improved process of polymerizing alkene oxides.

Another object of this invention is to provide a novel catalyst system for polymerizing alkene oxides.

A further object of this invention is to provide a process of polymerizing alkene oxides wherein the monomer conversion is much higher than the monomer conversion by the processes of the prior art.

Still another object of this invention is to produce rubbery alkene oxide polymers which are flexible at low temperatures, and which are highly resistant to the effects of high temperatures and to the effects of ozone.

A still further object of this invention is to provide a process of polymerizing alkene oxides which will result in the formation of a rubbery polymer product which can be sulfur vulcanized.

These and other objects of the invention will become apparent to one skilled in the art after studying the following detailed description and the appended claims.

The novel catalyst system comprising an organoaluminum compound, a metal salt of a beta-diketone, and water can be employed for polymerizing any alkene oxide. For example, alkene oxides containing up to and including 20 carbon atoms per molecule can be polymerized by the process of this invention. Generally, it is preferred that the alkene oxide monomer contain from about 2 to about 8 carbon atoms. Thus, alkene oxides which can be polymerized in accordance with this invention can be represented by the formula

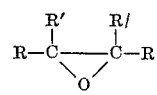

wherein R and R′ are selected from the group consisting of hydrogen, saturated aliphatic, saturated cycloaliphatic, monoolefinic aliphatic, diolefinic aliphatic (conjugated and nonconjugated), monoolefinic cycloaliphatic, diolefinic cycloaliphatic (conjugated and nonconjugated), and aromatic radicals and combinations of these such as aralkyl, alkaryl, and the like. Some or all of the R and R′ radicals can be halogen-substituted, and can contain oxygen in the form of an acyclic ether linkage (—O—) or an oxirane group

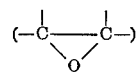

Further, the alkene oxides represented by the above formula can contain 1 or 2 olefinic linkages, 1 or 2 oxirane groups, and up to 1 ether linkage. In addition, both R′ variables can represent a divalent aliphatic hydrocarbon radical which, together with the carbon atoms of the oxirane group, can form a cycloaliphatic hydrocarbon nucleus containing from about 4 to about 10 carbon atoms and preferably from about 4 to about 8 carbon atoms.

Specific examples of some of the alkene oxides which are within the above structural formula and which can be homopolymerized or copolymerized in accordance with this invention are ethylene oxide (epoxyethane); 1,2 - epoxypropane (propylene oxide); 1,2 - epoxybutane; 2,3 - epoxybutane; 1,2 - epoxypentane; 2,3 - epoxypentane; 1,2 - epoxyhexane; 3,4 - epoxyhexane; 1,2-epoxyheptane; 2,3 - epoxyoctane; 2,3 - dimethyl - 2,3-epoxypentane; 1,2 - epoxy - 4 - methylpentane; 2,3-epoxy - 5 - methylhexane; 1,2 - epoxy - 4,4 - dimethylpentane; 4,5 - epoxyeicosane; 1 - chloro - 2,3 - epoxypropane (epichlorohydrin); 1 - bromo - 2,3 - epoxypropane; 1,5 - dichloro - 2,3 - epoxypentane; 2 - iodo - 3,4 - epoxybutane; styrene oxide; 6 - oxabicyclo[3.1.0] hexane; 7-oxabicyclo[4.1.0]heptane; 3 - n - propyl - 7-oxabicyclo[4.1.0]heptane; bis(2,3 - epoxybutyl) ether; tert - butyl 4,5 - epoxyhexyl ether; and 2 - phenylethyl 3,4 - epoxybutyl ether.

Unsaturated alkene oxides within the above structural formula, including ethers, which can be homopolymerized or copolymerized with the saturated alkene oxide include allyl 2,3-epoxypropyl ether (allyl glycidyl ether;
allyl 3,4-epoxybutyl ether;
1-methallyl 3,4-epoxyhexyl ether;
3-hexenyl 5,6-epoxyhexyl ether;
2,6-octadienyl 2,3,7,8-diepoxyoctyl ether;
6-phenyl-3-hexenyl 3-ethyl-5,6-epoxyhexyl ether;
3,4-epoxy-1-butene (butadiene monoxide);
3,4-epoxy-1-pentene;
5-phenyl-3,4-epoxy-1-pentene;
1,2,9,10-diepoxy-5-decene;
6,7-di-n-butyl-3,4,9,10-diepoxy-1,11-dodecadiene;
epoxy vinyl ether;
allyl 2-methyl-2,3-epoxypropyl ether;
3-cyclohexyl-2-propenyl 4-cyclohexyl-3,4-epoxybutyl ether;
2,4-pentadienyl 2,3-diethyl-3,4-epoxybutyl ether;
1-methallyl 6-phenyl-3,4-epoxyhexyl ether;
5-(4-tolyl)2,3-epoxypentyl vinyl ether;
bis[4-(3-cyclopentenyl)2,3-epoxybutyl] ether;
2-(2,4-cyclohexadienyl)ethyl 2,3-epoxybutyl ether;
2-(2,5-cyclohexadienyl)ethyl 2-benzyl-4,5-epoxypentyl ether;
3,4-epoxy-1,5-hexadienyl isopropyl ether;
allyl 3,4-dimethyl-3,4-epoxyhexyl ether;
3,4-epoxy-4-(2,3-dimethylphenyl)1-butene;
3,4-dimethyl-3,4-epoxy-1-pentene;
5-(4-methylcyclohexyl)3,4-epoxy-1-pentene;
4,5-diethyl-4,5-epoxy-2,6-octadiene;
4-(2,4-cyclopentadienyl)1,2,6,7-diepoxyheptane;
and 1-phenyl-1,2-epoxy-5,7-octadiene.

The novel catalyst of this invention comprises an organoaluminum compound, a metal salt of a beta-diketone, and water. The organoaluminum compound of the catalyst can be represented by the formula $$R''_n AlX_m$$

wherein R'' is a hydrocarbon radical selected from the group consisting of saturated aliphatic, saturated cycloaliphatic, and aromatic containing from 1 to 20 carbon atoms, inclusive, and combinations such as alkaryl aralkyl, and the like; X is a member of the class consisting of hydrogen, fluorine, chlorine, bromine, and iodine; n is an integer of from 1 to 3, inclusive; m is an integer of from 0 to 2, inclusive; and the sum of the integers n and m equals 3. Organoaluminum compounds within the above formula include triorganoaluminum compounds, organoaluminum monohalides, organoaluminum monohydrides, organoaluminum dihalides, organoaluminum dihydrides, and organoaluminum sesquihalides. The organoaluminum sequihalides as herein defined are intended to mean a mixture of organoaluminum monohalides and oragnoaluminum dihalides of the formulas $R''_2AlX$ and $R''AlX_2$, respectively, wherein R'' is the same as hereinbefore defined with respect to the general formula and X is a halogen. The organoaluminum sesquihalides can then be written as $R''_3Al_2X_3$ or as $R_{1\ 1/2}AlX_{1\ 1/2}$. Exemplary organoaluminum compounds within the above formula include trimethylaluminum,
triethylaluminum,
tri-n-butylaluminum,
triisobutylaluminum,
tri-n-hexylaluminum,
tri-n-decylaluminum,
tri-n-eicosylaluminum,
tricyclohexylaluminum,
triphenylaluminum,
methyldiphenylaluminum,
ethyldi(3,5-di-n-heptylphenyl)aluminum,
tribenzylaluminum,
tri-1-naphthylaluminum,
di-n-octylphenylaluminum,
tri-4-tolylaluminum,
dimethylchloroaluminum,
methyldichloroaluminum,
n-heptyldifluoroaluminum,
(3-ethylcyclopentyl)diiodoaluminum,
methylisobutyl-chloroaluminum,
diphenylbromoaluminum,
dibenzylchloroaluminum,
di-n-octylchloroaluminum,
n-octylphenylchloroaluminum,
di-n-eicosyliodoaluminum,
n-butyldihydroaluminum,
methyldihydroaluminum,
diisopropylhydroaluminum,
ethylmethylhydroaluminum,
diphenylhydroaluminum,
benzyl-n-dodecylhydroaluminum,
dicyclohexylhydroaluminum,
2,6-di-n-butyl-4-n-hexylphenyldihydroaluminum,
and n-amylethylhydroaluminum.

The metal salt of the beta-diketone portion of the catalyst system can be represented by the formula

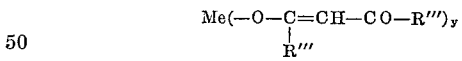

wherein Me is a metal selected from Groups II–A, III–A, IV–A, I–B, II–B, IV–B, V–B, V–IB, V–IIB, and V–III of the Periodic Table of the Elements in the "Handbook of Chemistry and Physics," 45th edition, page B–2, The Chemical Rubber Company (1964); each R''' is a radical selected from the group consisting of saturated aliphatic, saturated cycloaliphatic, and aromatic containing from 1 to 10 carbon atoms, inclusive; and y is an integer equal to the valence of the metal Me (Moeller, "Inorganic Chemistry," page 241, Wiley and Sons, 1952). Preferred metals within the above groups include calcium, strontium, barium, copper, beryllium, magnesium, zinc, cadmium, mercury, boron, aluminum, gallium, indium, thallium, silicon, germanium, tin, lead, silver, vanadium, chromium, molybdenum, tungsten, manganese, iron, cobalt, nickel, zirconium, and titanium.

Specific beta-diketones which can be combined with a metal from the above groups to form the corresponding metal salt include 2,4-pentanedione (acetylacetone);
3,5-heptanedione;
11,13-tricosanedione;
1,3-dicyclohexyl-1,3-propanedione;

1,5-dicyclopentyl 2,4-pentanedione;
1,3-diphenyl-1,3-propanedione;
1,5-dicyclopentyl-2,4-pentanedione;
2,8-dimethyl-4,6-nonanedione;
1,3-di(4-n-butylphenyl)1,3-propanedione;
1,11-diphenyl-5,7-hendecanedione;
1-phenyl-1,3-butanedione;
2,4-decanedione;
and 1-(3,5-dimethylcyclohexyl)2,4-pentanedione.

The water which is employed as the third component of the catalyst of this invention assists in producing higher molecular weight rubbery polymers than are otherwise obtained. Although it is not actually known just how the water functions in the polymerization reaction, the data show the improved results obtained when water is employed in cooperation with the organoaluminum compound and the metal salt of the beta-diketone catalyst of the invention.

The alkene oxide polymerization reaction of this invention can be conducted either as a batch or as a continuous process with the novel catalyst system being added in a single initial charge or in predetermined increments during polymerization. The catalyst system can be prepared by separately mixing the components and then charging the mixture in a manner as hereinbefore described or the catalyst components can be separately charged. Similarly, the alkene oxide monomers can be introduced into the reaction zone in one charge or they can be added gradually during polymerization. In order to expedite and improve the efficiency of the polymerization reaction, it is generally preferred that the reaction be conducted in the presence of an inert diluent. Suitable diluents which can be used for this purpose include paraffinic, cycloparaffinic, and aromatic hydrocarbons containing from about 4 to about 10 carbon atoms per molecule. Exemplary diluents which can be used are butane, pentane, hexane, decane, cyclopentane, cyclohexane, methylcyclohexane, benzene, toluene, xylene, ethylbenzene, and the like. It is also within the spirit and scope of this invention to employ halogenated hydrocarbons as diluents. Diluents within this class include chlorobenzene and the like. Since the actual diluent employed is largely a matter of choice, it is obviously possible to employ other diluents than those herein identified without departing from the spirit and scope of the invention. It is also possible to employ mixtures of two or more suitable compounds as diluents.

The amount of catalyst used for effecting polymerization of the alkene oxides can vary over a rather broad range. The catalyst level is preferably and for convenience determined on the basis of the organoaluminum compound in the catalyst system. As a general rule, the amount of catalyst is maintained within the range of about 1 to about 100 gram millimoles of organoaluminum compound per 100 grams of monomer being polymerized and preferably in the range of about 5 to about 40 gram millimoles of organoaluminum compound per 100 grams of monomer. In the copolymerization of two or more alkene oxide monomers, the amount of catalyst is based on the total amount of alkene oxide monomers.

The metal salt of the beta-diketone employed in the catalyst system is based on the amount of organoaluminum compound present. Generally, the mole ratio of the metal salt of the beta-diketone to the organoaluminum compound is within the range of about 0.01:1 to about 0.5:1 and preferably within the range of about 0.03:1 to about 0.3:1. Obviously, the metal salt can be used in amounts outside of the range recited without departing from the scope of the invention.

The quantity of water employed in the catalyst system is also based on the organoaluminum component. Generally, the water is present in the catalyst system in an amount within the range of about 0.02 to about 1.6 moles per mole of organoaluminum compound and preferably within the range of about 0.1 to about 1 mol per mol of organoaluminum compounds.

The temperature and pressure at which the polymerization reaction of this invention is effected can vary over a rather wide range. Generally, the reaction is conducted at a temperature within the range of about 40 to about 250° F. and preferably within the range of about 85 to about 200° F. Polymerization is usually conducted at a pressure which will maintain the materials substantially completely in the liquid state. Obviously, the reaction can be conducted at superatmospheric pressures of several thousand pounds if desired.

The duration of the reaction will depend primarily upon temperature, pressure, and the activity of the particular catalyst being used. Usually, the process will be conducted for a period of from about a few minutes or less to about 100 hours or more. A preferred range is from about 10 minutes to about 50 hours. Termination of the reaction, removal of catalyst, recovery of polymer, and so on, can be carried out in a conventional manner.

The alkene oxide polymers produced in accordance with the novel catalyst system of this invention exhibit extremely good low temperature flexibility. The polymers are particularly resistant to the effects of heat and to the effects of ozone. The polymers have unlimited utility in the automobile industry for fabricating articles such as motor mounts, body mounts, suspension system parts, hoses, tubing, and the like.

The following examples will serve to illustrate the improved results obtained by polymerizing alkene oxides with the novel catalyst system of this invention. It must be understood that such examples are for the purpose of illustration only, and that many variations and modifications can be made from the various examples by one skilled in the art without departing from the concept of the invention.

EXAMPLES 1–24

A series of runs was conducted whereby 1,2-epoxypropane was polymerized by means of a catalyst comprising triisobutylaluminum, various metal salts of 2,4-pentanedione, and water. Variable quantities of water were used to illustrate the operability of the invention over a rather broad range. Control runs without water were made in order to illustrate the improved result obtained by water in cooperation with the organoaluminum compound and the metal salt of the 2,4-pentanedione. The materials were charged to a reactor in the following proportions:

| | |
|---|---:|
| 1,2-epoxypropane, parts by weight | 100 |
| Cyclohexane, parts by weight | 780 |
| Triisobutylaluminum (TBA), mhm.[1] | 30 |
| Metal salt of 2,4-pentanedione, mhm.[1] | 5 |
| Water, mhm.[1] | Variable |
| Metal salt: TBA mole ratio | 0.17:1 |
| Temperature, ° F. | 158 |
| Time, hours | 7 |

[1] Gram millimoles per 100 grams monomer.

The actual polymerization technique employed involved the steps of charging the reactor with cyclohexane and thereafter purging it with nitrogen. The 1,2-epoxypropane was then charged to the reactor followed by the triisobutylaluminum and the water. The metal salt of the 2,4-pentanedione was then charged to the reactor, and polymerization allowed to continue for the period indicated. At the termination of each run, the viscosity of the reaction mixture was reduced by charging acetone to the reactor. The mixture was then poured into water which had previously been acidified with hydrochloric acid. The mixture was then allowed to settle to form an aqueous phase and an organic phase. The aqueous phase was separated and removed. Approximately one weight percent, based on the polymer, of 2,2'-methylene-bis(4-methyl-6-tert-butylphenol) antioxidant was added to the organic phase and the polymer recovered from it by evaporating the diluent. The polymer thus recovered was dried under vacuum. Table I below illustrates the properties of each of the polymers produced by means of the different catalyst systems employed.

In order to determine the inherent viscosity, one-tenth gram of polymer was placed in a wire cage made from 80-mesh screen and the cage was placed in 100 ml. of

| Water, mhm.[1] | 20 |
|---|---|
| Metal Salt: TBA mole ratio | 0.17:1 |
| $H_2O$:TBA mole ratio | 0.67:1 |
| Temperature, °F. | 158 |
| Time, hours | 24 |
| Monomer conversion (percent) | 100 |

[1] Gram millimoles per 100 grams monomer.

TABLE I

| Example No. | Metal Salt of Beta-Diketone | Water, mhm.* | Mole Ratio $H_2O$:TBA | Monomer Conversion (%) | Inherent Viscosity |
|---|---|---|---|---|---|
| Control | Zinc Acetylacetonate (Zn++) | 0 | | 65 | 5.51 |
| 1 | do | 5 | 0.17:1 | 90 | 3.82 |
| 2 | do | 10 | 0.33:1 | 90 | 2.66 |
| 3 | do | 15 | 0.5:1 | 99 | 3.59 |
| 4 | do | 30 | 1:1 | 90 | 2.80 |
| Control | Cupric Acetylacetonate (Cu++) | 0 | | 10 | |
| 5 | do | 10 | 0.33:1 | 52 | |
| 6 | do | 15 | 0.5:1 | 73 | |
| 7 | do | 20 | 0.67:1 | 85 | 2.47 |
| Control | Zirconium Acetylacetonate (Zr++++) | 0 | | 51 | 3.92 |
| 8 | do | 5 | 0.17:1 | 73 | 3.12 |
| 9 | do | 10 | 0.33:1 | 83 | 3.23 |
| 10 | do | 15 | 0.5:1 | 92 | 2.90 |
| Control | Vanadium Acetylacetonate (V+++) | 0 | | 22 | 2.01 |
| 11 | do | 10 | 0.33:1 | 30 | 2.53 |
| 12 | do | 15 | 0.5:1 | 41 | 3.51 |
| Control | Manganese Acetylacetonate (Mn++) | 0 | | 4 | |
| 13 | do | 5 | 0.17:1 | 39 | |
| 14 | do | 10 | 0.33:1 | 91 | |
| 15 | do | 20 | 0.67:1 | 97 | 4.44 |
| Control | Manganese Acetylacetonate (Mn+++) | 0 | | 11 | 5.26 |
| 16 | do | 10 | 0.33:1 | 81 | 5.06 |
| 17 | do | 15 | 0.5:1 | 100 | 4.24 |
| Control | Iron Acetylacetonate (Fe++) | 0 | | 12 | |
| 18 | do | 10 | 0.33:1 | 61 | |
| 19 | do | 15 | 0.5:1 | 94 | 3.10 |
| 20 | do | 20 | 0.67:1 | 100 | |
| 21 | do | 30 | 1:1 | 51 | |
| Control | Cobalt Acetylacetonate (Co++) | 0 | | 26 | |
| 22 | do | 10 | 0.33:1 | 71 | |
| 23 | do | 15 | 0.5:1 | 99 | 5.73 |
| 24 | do | 20 | 0.67:1 | 99 | |

*Gram millimoles per 100 grams monomer.

toluene contained in a wide-mouth, 4-ounce bottle. After standing at room temperature (approximately 77° F.) for about 24 hours, the cage was removed and the solution filtered through a sulfur absorption tube of Grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

It can be seen from these data that the catalyst system comprising the organoaluminum compound, the metal salt of the beta-diketone, and the water is superior to the catalyst system comprising only the organoaluminum compound and the metal salt of the beta-diketone in the sense that the percent monomer conversion is much higher. All of the polymers produced by the catalyst system of this invention were observed to be gel-free, high molecular weight rubbers.

EXAMPLE 25

Allyl glycidyl ether was copolymerized with 1,2-epoxypropane by means of a catalyst system comprising triisobutylaluminum zinc salt of 2,4-pentanedione, and water. The materials were charged to a reactor in the following proportions:

| 1,2-epoxypropane, parts by weight | 90 |
|---|---|
| Allyl glycidyl ether, parts by weight | 10 |
| Toluene, parts by weight | 860 |
| Triisobutylaluminum, mhm.[1] | 30 |
| Zinc salt of 2,4-pentanedione (zinc acetylacetonate) | 5 |

The technique employed for effecting the copolymerization reaction was the same as the technique followed and described in Examples 1–24. The copolymer produced was a high molecular weight rubber. This example illustrates the operability and the improved result obtained by the catalyst system of this invention for forming a copolymer.

EXAMPLES 26–29

A series of runs was conducted whereby epichlorohydrin was polymerized by means of a catalyst system comprising triisobutylaluminum, various metal salts of 2,4-pentanedione, and water. Control runs were made without water in order to illustrate the improved and unexpected result obtained with the catalyst system comprising the organoaluminum compound, the metal salt of the beta-diketone, and the water. The materials were charged to a reactor in the following proportions:

| Epichlorohydrin, parts by weight | 100 |
|---|---|
| Toluene, parts by weight | 860 |
| Triisobutylaluminum, mhm.[1] | 30 |
| Metal salt of 2,4-pentanedione, mhm.[1] | Variable |
| Water, mhm.[1] | 20 |
| $H_2O$:TBA mole ratio | 0.67:1 |
| Temperature, °F. | 122 |
| Time, hours | 20 |

[1] Gram millimoles per 100 grams monomer.

The technique used for polymerizing the epichlorohydrin was the same as that followed and described in Examples 1–24 except for the order of charging the materials to the reactor. In the examples, the toluene was first charged to the reactor followed by the epichlorohydrin the water, the metal salt of the 2,4-pentanedione, and the triisobutylaluminum. All of the polymers produced by means of this catalyst were high molecular weight rubbers. The results obtained are reported in Table II beow.

this invention can be used for polymerizing epichlorohydrin.

TABLE II

| Example No. | Metal Salt of 2,4-Pentanedione | | Water, mhm.* | Mole Ratio (H₂O:TBA) | Monomer Conversion (%) |
|---|---|---|---|---|---|
| | Type | mhm.* | | | |
| Control | Cobalt Acetylacetonate (Co⁺⁺) | 6 | | | 23 |
| 26 | do | 6 | 20 | 0.67:1 | 100 |
| Control | Zinc Acetylacetonate (Zn⁺⁺) | 6 | | | 20 |
| 27 | do | 15 | 20 | 0.67:1 | 56 |
| 28 | do | 6 | 20 | 0.67:1 | 100 |
| Control | Zirconium Acetylacetonate (Zr⁺⁺⁺⁺) | 6 | | | 45 |
| 29 | do | 6 | 20 | 0.67:1 | 74 |

*Gram millimoles per 100 grams monomer.

EXAMPLES 30-35

A series of runs was conducted whereby epichlorohydrin was copolymerized with 1,2-epoxypropane (propylene oxide) by means of a catalyst comprising triisobutylaluminum, zinc salt of 2,4-pentanedione, and water. The materials were charged to a reactor as follows:

Epichlorohydrin, parts by weight _____ Variable
Propylene oxide, parts by weight _____ Variable
Toluene, parts by weight _____ 860
Triisobutylaluminum, mhm.¹ _____ 30
Zinc salt of 2,4-pentanedione, mhm.¹ _____ 6
Water, mhm.¹ _____ 20
Zn salt:TBA mole ratio _____ 0.2:1
H₂O:TBA mole ratio _____ 0.67:1
Temperature, ° F. _____ Variable
Time, hours _____ 24

¹ Gram millimoles per 100 grams monomer.

The technique used for copolymerzing the epichlorohydrin and 1,2-epoxypropane was the same as that used in Examples 1-24. All of the copolymers produced were high molecular weight rubbers. The results obtained from these runs are reported in Table III below.

TABLE III

| Example No. | Temperature (° F.) | Ratio of Epichlorohydrin to 1,2-epoxypropane (by weight) | Monomer Conversion (%) |
|---|---|---|---|
| 30 | 158 | 60/40 | 90 |
| 31 | 158 | 50/50 | 92 |
| 32 | 158 | 30/70 | 100 |
| 33 | 122 | 60/40 | 60 |
| 34 | 122 | 50/50 | 56 |
| 35 | 122 | 30/70 | 70 |

EXAMPLES 36 AND 37

Two runs were made whereby epichlorohydrin was polymerized by means of a catalyst comprising triisobutylaluminum, zinc salt of 2,4-pentanedione, and water. The quantities of the catalyst used were varied between the two runs in order to illustrate the utility of the invention with different catalyst concentrations. The polymerization reactions were conducted in toluene, using 860 parts by weight of toluene for each 100 parts by weight of epichlorohydrin monomer. Polymerization was conducted at the temperature of 156° F. The polymerization technique was the same as that described in connection with Examples 1-24. The results obtained are presented in Table IV below.

As hereinbefore indicated, any unsaturated alkene oxide can be homopolymerized or copolymerized with a saturated or unsaturated alkene oxide to form a rubbery polymer which can be sulfur vulcanized. Although the examples herein presented illustrate the copolymerization of 1,2-epoxypropane with allyl glycidyl ether and with epichlorohydrin, it is obvious that the invention is not intended to be limited thereto. For example, the catalyst of this invention can be used to form a copolymer of epichlorohydrin and allyl glycidyl ether. In the copolymerization of two unsaturated alkene oxides with the novel catalyst system of this invention, it is generally preferred to form a copolymer of allyl 2,3-epoxypropyl ether (allyl glycidyl ether) and 3,4-epoxy-1-butene (butadiene monoxide). These copolymers can be freely sulfur vulcanized because the polymer chains contain a multiplicity of olefinic bonds.

Although the invention has been described in considerable detail, it must be understood that such detail is for the purpose of illustration only and that many variations and modifications can be made by one skilled in the art without departing from the spirit and scope of the invention.

We claim:

1. A process of producing a polymer of an epoxide compound which comprises polymerizing an alkene oxide of the formula

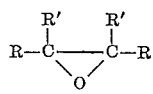

wherein R and R' are selected from the group consisting of hydrogen, saturated aliphatic, saturated cycloaliphatic, monoolefinic aliphatic, diolefinic aliphatic, monoolefinic cycloaliphatic, diolefinic cycloaliphatic, and aromatic radicals, halogen-substituted radicals of the foregoing type, and combinations thereof, and said radicals can contain oxygen in the form of an acyclic ether linkage (—O—) or an oxirane group

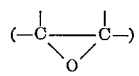

and said alkene oxide can contain 1 or 2 olefinic linkages, 1 or 2 oxirane groups, and 1 ether linkage, and both R' variables in said alkene oxide can represent a divalent aliphatic hydrocarbon radical which together with the oxirane group in said alkene oxide can form a cyclo-

TABLE IV

| Example No. | Triisobutylaluminum, mhm.* | Zinc Salt of 2,4-Pentanedione or Acetylacetone | | H₂O mhm.* | Polymerization Time, Hours | Monomer Conversion (%) | Inherent Viscosity |
|---|---|---|---|---|---|---|---|
| | | Type | mhm.* | | | | |
| 36 | 30 | Zinc Salt | 3 | 20 | 0.6 | 62 | 4.38 |
| 37 | 10 | do | 1 | 10 | 18 | 55 | 5.82 |

*Gram millimoles per 100 grams monomer.

The epichlorohydrin polymer produced by the catalyst of Examples 36 and 37 was a high molecular weight rubber. The inherent viscosity was determined in the same manner as that described in connection with Examples 1-24. It can be seen from these data that the catalyst of aliphatic nucleus in the presence of a catalyst comprising (a) an organoaluminum compound of the formula $$R''_nAlX_m$$ 

wherein R'' is a hydrocarbon radical selected from the group consisting of saturated aliphatic, saturated cycloaliphatic, and aromatic containing from 1 to 20 carbon atoms, inclusive; X is a member of the class consisting of hydrogen, fluorine, chlorine, bromine, and iodine; $n$ is an integer of from 1 to 3, inclusive; $m$ is an integer of from 0 to 2, inclusive; and the sum of the integers $n$ and $m$ equals 3; (b) a metal salt of a beta-diketone of a metal selected from Groups II–A, III–A, IV–A, I–B, II–B, IV–B, V–B, VI–B, VII–B, and V–III of the Periodic Table; and (c) water.

2. The process of claim 1 wherein said polymerizing is carried out at a temperature within the range of about 40 to about 250° F. said organoaluminum compound is present in an amount within the range of about 1 to about 100 gram millimoles per 100 grams of alkene oxide, the mole ratio of said metal salt to said organoaluminum compound being within the range of about 0.01:1 to about 0.5:1; and water present in an amount within the range of about 0.02 to about 1.6 moles per mole of organoaluminum compound.

3. The process of claim 2 wherein said metal salt of a beta-diketone is of the formula

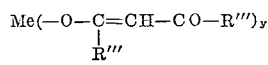

wherein Me is a metal selected from Groups II–A, III–A, IV–A, I–B, II–B, IV–B, V–B, VI–B, VII–B, and V–III of the Periodic Table; each R‴ is a radical selected from the group consisting of saturated aliphatic, saturated cycloaliphatic, and aromatic containing from 1 to 10 carbon atoms, inclusive; and $y$ is an integer equal to the valence of the metal Me.

4. A process of producing a copolymer of 1,2-epoxypropane and allyl glycidyl ether comprising charging an inert liquid diluent to a reaction zone; charging allyl glycidyl ether to said reaction zone; charging 1,2-epoxypropane to said reaction zone; charging an organoaluminum compound to said reaction zone, said organoaluminum compound being represented by the formula $$R''_n AlX_m$$

wherein R″ is a hydrocarbon radical selected from the group consisting of saturated aliphatic, saturated cycloaliphatic, and aromatic containing from 1 to 20 carbon atoms, inclusive; X is a member of the class consisting of hydrogen, fluorine, chlorine, bromine, and iodine; $n$ is an integer of from 1 to 3, inclusive; $m$ is an integer of from 0 to 2, inclusive; and the sum of the integers $n$ and $m$ equals 3; charging water to said reaction zone; charging a metal salt of a beta-diketone to said reaction zone, said metal salt being represented by the formula

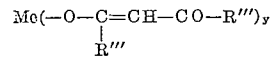

wherein Me is a metal selected from Groups II–A, III–A, IV–A, I–B, II–B, IV–B, V–B, VI–B, VII–B, and V–III of the Periodic Table; each R‴ is a radical selected from the group consisting of saturated aliphatic, saturated cycloaliphatic, and aromatic containing from 1 to 10 carbon atoms, inclusive; and $y$ is an integer equal to the valence of the metal Me; and recovering the copolymers so produced.

5. A process according to claim 4 wherein the organoaluminum compound is present in an amount within the range of about 1 to about 100 gram millimoles per 100 grams of alkene oxide; and wherein the mole ratio of the metal salt of the beta-diketone to the organoaluminum compound is within the range of about 0.01:1 to about 0.5:1.

6. A process according to claim 5 wherein said organoaluminum compound is triisobutylaluminum and said metal salt is zinc acetylacetonate.

7. A process of producing a copolymer of epichlorohydrin and 1,2-epoxypropane comprising charging an inert liquid diluent to a reaction zone; charging epichlorohydrin to said reaction zone; charging 1,2-epoxypropane to said reaction zone; charging triisobutylaluminum to said reaction zone; charging water to said reaction zone; charging the zinc salt of 2,4-pentanedione to said reaction zone allowing said copolymer to form at a temperature within the range of about 40 to 250° F.; and recovering the copolymer so produced.

8. A process according to claim 7 wherein said triisobutylaluminum is present in an amount within the range of about 1 to about 100 gram millimoles per 100 grams of the total amount of epichlorohydrin and 1,2-epoxypropane; and wherein the mole ratio of the zinc salt of the 2,4-pentanedione to the triisobutylaluminum is within the range of about 0.01:1 to about 0.5:1.

References Cited

UNITED STATES PATENTS 3,135,705   6/1964   Vandenberg _____ 260—2
3,267,076   8/1966   Ishii et al. _____ 252—431

OTHER REFERENCES

J. Polymer Sci., 51 (1961), issue 156 (pp. S7–S10 relied on), Kambara et al.

WILLIAM H. SHORT, *Primary Examiner.*

T. PERTILLA, *Assistant Examiner.*